(12) United States Patent
Hicks et al.

(10) Patent No.: US 11,442,839 B2
(45) Date of Patent: Sep. 13, 2022

(54) RUNTIME METRICS BASED TEST ORDERING

(71) Applicant: International Business Machines Corporation, Armonk, NY (US)

(72) Inventors: Andrew C. M. Hicks, Wappingers Falls, NY (US); Ryan Thomas Rawlins, New Paltz, NY (US); Deborah A. Furman, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/813,792

(22) Filed: Mar. 10, 2020

(65) Prior Publication Data
US 2021/0286704 A1  Sep. 16, 2021

(51) Int. Cl.
*G06F 11/36* (2006.01)
(52) U.S. Cl.
CPC ...... *G06F 11/3612* (2013.01); *G06F 11/3676* (2013.01); *G06F 11/3684* (2013.01); *G06F 11/3688* (2013.01)
(58) Field of Classification Search
None
See application file for complete search history.

(56) References Cited

U.S. PATENT DOCUMENTS

| | | | | |
|---|---|---|---|---|
| 6,754,612 B1 * | 6/2004 | Vanfladern | .......... | G06F 11/3428 714/E11.2 |
| 7,287,159 B2 * | 10/2007 | Rabin | .......... | G06F 21/564 713/161 |
| 7,730,460 B1 * | 6/2010 | Warren | .......... | G06F 11/3664 717/133 |
| 8,135,657 B2 | 3/2012 | Kapoor et al. | | |

(Continued)

FOREIGN PATENT DOCUMENTS

CN   104461908 B   4/2017

OTHER PUBLICATIONS

D. Marijan, "Multi-perspective Regression Test Prioritization for Time-Constrained Environments," 2015 IEEE International Conference on Software Quality, Reliability and Security, Vancouver, BC, 2015, pp. 157-162, doi: 10.1109/QRS.2015.31. (Year: 2015).*

(Continued)

*Primary Examiner* — Andrew M. Lyons
(74) *Attorney, Agent, or Firm* — Cantor Colburn LLP; Teddi Maranzano

(57) ABSTRACT

Techniques for runtime metrics based test ordering in a computer system are described herein. An aspect includes determining a first runtime metric associated with a first module based on the execution of a first test case. Another aspect includes determining a second runtime metric associated with a second module based on the execution of a second test case. Another aspect includes comparing the first runtime metric and the second runtime metric. Another aspect includes determining an order of a plurality of test (Continued)

cases based on the comparison of the first runtime metric and the second runtime metric. Another aspect includes executing the plurality of test cases in the determined order.

16 Claims, 5 Drawing Sheets

(56) References Cited

U.S. PATENT DOCUMENTS

| | | | | |
|---|---|---|---|---|
| 8,276,123 | B1* | 9/2012 | Deng | G06F 11/368 |
| | | | | 717/125 |
| 9,489,290 | B1* | 11/2016 | Boissy | G06F 11/3688 |
| 9,612,943 | B2* | 4/2017 | Boshernitsan | G06F 11/368 |
| 9,800,608 | B2 | 10/2017 | Korsunsky et al. | |
| 10,146,668 | B1* | 12/2018 | Chopra | G06F 11/3676 |
| 10,747,651 | B1* | 8/2020 | Vanderwall | G06F 11/3692 |
| 11,023,368 | B1* | 6/2021 | Furman | G06F 11/3676 |
| 2006/0156269 | A1* | 7/2006 | Hoffman | G06F 30/33 |
| | | | | 716/136 |
| 2007/0234293 | A1* | 10/2007 | Noller | G06F 11/3688 |
| | | | | 717/124 |
| 2008/0148236 | A1* | 6/2008 | Huang | G06F 11/3684 |
| | | | | 717/124 |
| 2011/0231708 | A1* | 9/2011 | Lawrance | G06F 11/3664 |
| | | | | 714/38.1 |
| 2013/0152047 | A1* | 6/2013 | Moorthi | G06F 11/368 |
| | | | | 717/124 |
| 2013/0159774 | A1* | 6/2013 | Budnik | G06F 11/3688 |
| | | | | 714/33 |
| 2014/0137057 | A1* | 5/2014 | Tzoref-Brill | G01R 31/318314 |
| | | | | 716/107 |
| 2014/0215445 | A1* | 7/2014 | Chockler | G06F 11/3608 |
| | | | | 717/132 |
| 2014/0351793 | A1* | 11/2014 | Bartley | G06F 11/3676 |
| | | | | 717/124 |
| 2016/0140026 | A1* | 5/2016 | Evans | G06F 11/3676 |
| | | | | 714/38.1 |
| 2016/0314056 | A1* | 10/2016 | Greene | G06F 11/3664 |
| 2017/0262361 | A1* | 9/2017 | Francis | G06F 11/3672 |
| 2019/0042399 | A1* | 2/2019 | Nemoto | G06F 11/3688 |
| 2019/0146904 | A1* | 5/2019 | Gentile | G06F 11/3688 |
| | | | | 714/38.1 |
| 2019/0196950 | A1* | 6/2019 | Ranganathan | G06N 20/00 |
| 2019/0332523 | A1* | 10/2019 | Gefen | G06F 11/3688 |
| 2020/0034282 | A1* | 1/2020 | He | G06F 11/3688 |
| 2020/0242010 | A1* | 7/2020 | Hicks | G06F 11/3616 |
| 2020/0242011 | A1* | 7/2020 | Hicks | G06F 11/3692 |
| 2020/0242012 | A1* | 7/2020 | Hicks | G06F 11/3684 |
| 2020/0242013 | A1* | 7/2020 | Hicks | G06F 11/3676 |
| 2020/0379887 | A1* | 12/2020 | Nochilur | G06F 11/3684 |
| 2020/0394118 | A1* | 12/2020 | Hicks | G06F 11/3688 |
| 2020/0394125 | A1* | 12/2020 | Hicks | G06F 16/9027 |
| 2020/0394126 | A1* | 12/2020 | Hicks | G06F 11/3676 |
| 2020/0394127 | A1* | 12/2020 | Hicks | G06F 11/3684 |
| 2020/0394128 | A1* | 12/2020 | Hicks | G06F 8/71 |
| 2020/0394129 | A1* | 12/2020 | Hicks | G06F 11/3676 |
| 2021/0263840 | A1* | 8/2021 | Hicks | G06N 20/00 |
| 2021/0271592 | A1* | 9/2021 | Hicks | G06F 11/3688 |

OTHER PUBLICATIONS

A. Yamuç, M. Ö. Cingiz, G. Biricik and O. Kalipsiz, "Solving test suite reduction problem using greedy and genetic algorithms," 2017 9th International Conference on Electronics, Computers and Artificial Intelligence (ECAI), Targoviste, 2017, pp. 1-5, doi: 10.1109/ECAI.2017.8166445. (Year: 2017).*

J. Anderson, H. Do and S. Salem, "Experience report: Mining test results for reasons other than functional correctness," 2015 IEEE 26th International Symposium on Software Reliability Engineering (ISSRE), 2015, pp. 405-415, doi: 10.1109/ISSRE.2015.7381834. (Year: 2015).*

P. E. Strandberg, D. Sundmark, W. Afzal, T. J. Ostrand and E. J. Weyuker, "Experience Report: Automated System Level Regression Test Prioritization Using Multiple Factors," 2016 IEEE 27th International Symposium on Software Reliability Engineering (ISSRE), 2016, pp. 12-23, doi: 10.1109/ISSRE.2016.23. (Year: 2016).*

Anonymous,"A Heuristic Method for Test Case Generation Using Statistical Analysis." IP.com, Dec. 17, 2014. 8 Pages.

Anonymous,"Combining Combinatorial Models while Maintaining Full Coverage." IP.com, Jun. 25, 2014. 5 Pages.

Anonymous,"Method to Efficiently Store and Retrieve Solutions of a Combinatorial Search Space." IP.com, Jan. 11, 2012. 5 Pages.

Anonymous,"System and Method of Conquering Path Collection in Production Environments (Optimal Tracing Profile, Divided and Conquer, and Parallel Tracing)." IP.com, Jun. 26, 2013. 7 Pages.

Segall et al., "Using Binary Decision Diagrams for Combinatorial Test Design." google.com, Jul. 2011. 11 Pages.

Whaley,"Context-Sensitive Pointer Analysis Using Binary Decision Diagrams." GOOGLE.com, Mar. 2007. 216 Pages.

* cited by examiner

RUNTIME METRICS BASED TEST ORDERING

BACKGROUND

The present invention generally relates to computer systems, and more specifically, to runtime metrics based test ordering in a computer system.

Computerized devices control almost every aspect of our life—from writing documents to controlling traffic lights. However, computerized devices are often error-prone, and thus require a testing phase in which the errors should be discovered. The testing phase is considered one of the most difficult tasks in designing a computerized device. The cost of not discovering an error may be enormous, as the consequences of the error may be disastrous. Coverage tools for checking software provide a measure of how well the software being evaluated has been exercised during testing and thereby give a level of assurance that the software is of high quality.

Typically, users of system development, testing and production environments (e.g., software developers, hardware developers, etc.) may use program logs, crash reports, and debuggers to investigate the quality of a product such as a software program, a hardware component, etc. Testing a product during a development cycle may be challenging. The larger the product, the more source code and components to be tested, and the more challenging the testing may become. A failure may occur during testing due to any number of factors such as source code changes, hardware design change, requirement changes, and environment changes, among other factors.

SUMMARY

Embodiments of the present invention are directed to runtime metrics based test ordering in a computer system. A non-limiting example computer-implemented method includes executing a first test case against a system under test (SUT), wherein executing the first test case comprises executing a first module. The method also includes determining a first runtime metric associated with the first module based on the execution of the first test case. The method also includes executing a second test case against the SUT, wherein executing the second test case comprises executing a second module. The method also determining a second runtime metric associated with the second module based on the execution of the second test case. The method also includes comparing the first runtime metric and the second runtime metric. The method also includes determining an order of a plurality of test cases based on the comparison of the first runtime metric and the second runtime metric. The method also includes executing the plurality of test cases against the SUT in the determined order.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
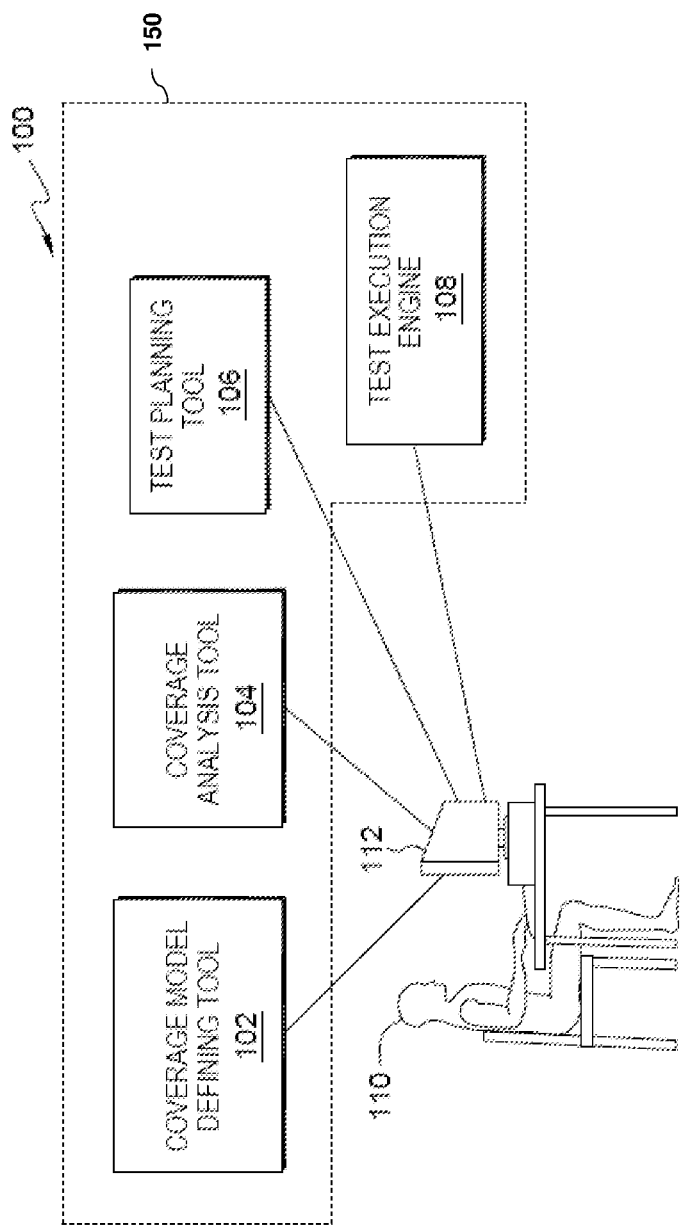
FIG. 1 shows a schematic illustration of a computerized environment in accordance with one or more embodiments of the present invention.

One or more embodiments of the present invention provide runtime metrics based test ordering. Executing test cases against a system under test (SUT) to find errors in software programs may be a time consuming and complex activity. Embodiments of runtime metrics based test ordering may be used to determine an order of test cases to execute in a regression test suite such that defects in the SUT may be found relatively efficiently. Runtime metrics may be accumulated for modules (e.g., functions) that are executed as part of test cases, and an order of the execution pipeline of test programs may be determined based on the runtime metrics. The runtime metrics may be determined based on observed execution behavior of modules during testing, including but not limited to elapsed execution time, memory utilization, central processing unit (CPU) time, and a number of Input/Output (I/O) transactions. In some embodiments, an execution order of test cases may be determined by, for example, recalculating a binary decision diagram corresponding to the testing based on the runtime metrics of the various modules.

Example embodiments of the present invention relate to, among other things, devices, systems, methods, computer-readable media, techniques, and methodologies for performing fault detection and localization using Combinatorial Test Design (CTD) techniques, generating a regression bucket of test cases that expose the detected fault, and dynamic selection of an order of execution of test cases within the regression bucket. In example embodiments, the detected and localized fault occurs in an SUT. The SUT may be a hardware system, a software system, or a combination thereof. The SUT can be tested using test cases in a regression bucket. Embodiments of the present invention may reorder the test cases in the regression bucket dynamically. The test case reordering facilitates may delay or bypass one or more test cases that are determined to be similar to another test case that is determined to have more favorable runtime metrics (e.g., lower elapsed execution time).

According to one or more embodiments of the present invention, CTD is performed with respect to an interaction requirement, such as a pair-wise interaction, n-tuple interaction, or any other. The test plan may provide for sufficient coverage tasks that assure that the interaction requirement is fulfilled. In some exemplary embodiments, test planning is based on a modeling of the test space using a functional coverage model. The test space can represent inputs, scenarios, configurations, the application's internal state, or any other aspect that might need to be tested. The functional coverage model may include a set of functional attributes. In other embodiments of the present invention, the coverage model can include one from a number of types of coverage known in the art, such as statement coverage, line coverage, condition coverage, path coverage, method coverage, and the like. The type of coverage does not affect identifying the soft failures.

Further, with respect to test planning, a test-space may define potential test cases that may be executed on the SUT. A test can be associated with exactly one potential test, as opposed to coverage tasks. In some exemplary embodiments of the present invention, several different test cases may hold the same potential test.

In some exemplary embodiments of the present invention, the motivation for the approach of CTD is that most bugs depend on the interaction between a small number of functional attributes. CTD algorithms may also deal with scalability issues. The CTD algorithms may assume that the combinations space is too large to be represented explicitly, and they use various techniques to try to generate an optimized test plan without explicitly enumerating all possible combinations. Examples of such algorithms may be a reduction to the orthogonal arrays or covering array problems. Those techniques are limited in the type of restrictions they allow on the value combinations, or in the type of requested interaction level, and still hit scalability issues as the number of model variables increases.

Despite these reduction efforts, once the SUT has been implemented, new features are typically requested and added as users exercise the functionality of the system. New test cases are created as the new features are added. Sets of test cases are, therefore, maintained for the SUT to ensure that previous functionality still works, that new functionality works, and that the new functionality does not adversely affect the old functionality. These test case sets are termed regression test cases, and the activity of testing the SUT to ensure conformance with legacy requirements is typically termed regression testing.

Generally, at least some of the regression test case sets are created and maintained manually over the life of the SUT. They are manually selected based on the number of test cases that can be run in an allotted amount of time, test cases that exercise the most important features of the SUT, and test cases that have historically exposed the greatest number of problems in the SUT when introducing new features, or other such reasons. A drawback of conventional regression testing is that some of the additional test cases repeat test actions that are covered by other test cases in the regression test case set. This is the penalty associated with the incremental addition of test cases. For a large, complex project, using the manual iterative method of adding test cases to the regression test case set can result in a large amount of functionally equivalent test actions. Such technical challenges are also addressed by the technical solutions facilitated by embodiments of the present invention.

In some embodiments of the present invention, a first test case may include a code flow including modules A-B-C, in which A may run in 5 units of time, B may run in 2 units of time, and C may run in 2 units of time. A second test case may include code flow including modules D-B-C, in which D may run in 3 units of time, B may run in 2 units of time, and C may run in 2 units of time. If modules A and D are functionally equivalent (e.g., based on respective end states or fingerprints), then the second test case D-B-C would run in less time than the first test case A-B-C. To save time in the testing, the second test case including modules D-B-C may be run before, or instead of, the first test case including modules A-B-C. In some embodiments, the test case reordering may be determined based on recalculating of a binary decision diagram. The recalculated binary decision diagram may maintain 100% n-wise coverage for the testing, due to the functional equivalence of A and D. Testing may be dynamically adjusted based on runtime metrics that are collected during the testing, and the binary decision diagram output may be recalculated during the testing in some embodiments. Recalculating the binary decision diagram may include reweighting the priorities of any remaining legs of the binary decision diagram. A next bucket of test entities may be selected based on the newly weighted binary decision diagram.

Referring now to FIG. 1, showing a schematic illustration of a computerized environment in accordance with embodiments of the present invention. A computerized environment 100 may include one or more computerized tools. It should be noted that the depiction is one possible example of a block diagram and that some components may not be depicted for clarity. The computerized tool includes a testing system 150 that is used to test other systems, such as the SUT.

In one or more embodiments of the present invention, an operator 110, such as a developer, a QA staff member, a tester, a designer, a verification engineer or the like, may interact with the testing system 150. The operator 110 may utilize a Man-Machine Interface (MMI) 112 such as a terminal, a display, a keyboard, an input device or the like.

In one or more embodiments of the present invention, the testing system 150 includes a coverage model defining tool 102, a coverage analysis tool 104, a test planning tool 106, and a test execution engine 108, among other components. In some exemplary embodiments of the present invention, a coverage model defining tool 102 may be utilized to define the test coverage model, such as a functional coverage model, or the like. In some exemplary embodiments of the present invention, the operator 110 may define the attributes that are to be tested, for example, the functional attributes in case a functional coverage is being tested. In some exemplary embodiments of the present invention, a similar tool may be utilized to define a test-space. In some exemplary embodiments, the coverage model may be adapted to be utilized as a test model.

In some exemplary embodiments of the present invention, a test execution engine 108 may be utilized to test the SUT. It will be noted that the SUT may be hardware, firmware, software, combination thereof, or any other type of computerized device. The test execution engine 108 may be a simulation-based verification tool, a test-generation platform, or the like. The test execution engine 108 may be operatively coupled to a test planning tool 106 and configured to perform testing in accordance with the test plan. In some exemplary embodiments, the test planning tool 106 may provide the test cases for the test execution engine 108 to perform. It will be noted that dynamic verification is a broader concept than testing the SUT, and it further includes test planning, coverage analysis and the like. The test execution engine 108 provides only one aspect of the entire scope of operations that may be performed during dynamic verification and should not be used to construe the term "dynamic verification" narrowly.

In some exemplary embodiments of the present invention, a coverage analysis tool 104 is configured to measure coverage of the test space for the SUT based on the dynamic verification performed by the test execution engine 108. For example, the coverage analysis tool 104 can be a functional coverage analysis tool. The coverage analysis tool 104 provides a coverage measurement, such as a portion of the coverage test-space or of the defined test plan, indicative of coverage tasks that were covered during dynamic verification performed by the test execution engine 108. The operator 110 may review the coverage measurement and/or the list of covered tasks.

In some exemplary embodiments of the present invention, a test planning tool 106 may define a test plan to be covered. In some exemplary embodiments of the present invention, the test plan may be a set of coverage tasks to be covered. In some exemplary embodiments of the present invention, the test planning tool 106 may provide test cases that are likely to cover the test plan, such as based on a test benchmark stored in a datastore which includes test cases that are known/estimated to cover specific aspects of the SUT. As another example, the test planning tool 106 is configured to generate test cases so as to cover coverage tasks. The operator 110 may review the test plan, the selected test or the like. In some exemplary embodiments of the present invention, the operator 110 may provide parameters for the test planning tool 106 to use in determining the objective of the test plan, such as a desired interaction level. Embodiments of the present invention enable the efficient execution of generated test cases.

While the depiction in FIG. 1 has been described with specific components including the coverage model defining tool 102, coverage analysis tool 104, test planning tool 106 and the test execution engine 108, embodiments of the present invention are not limited to these components or system configurations and can be implemented with other system configuration employing fewer or additional components.

Figure 2:
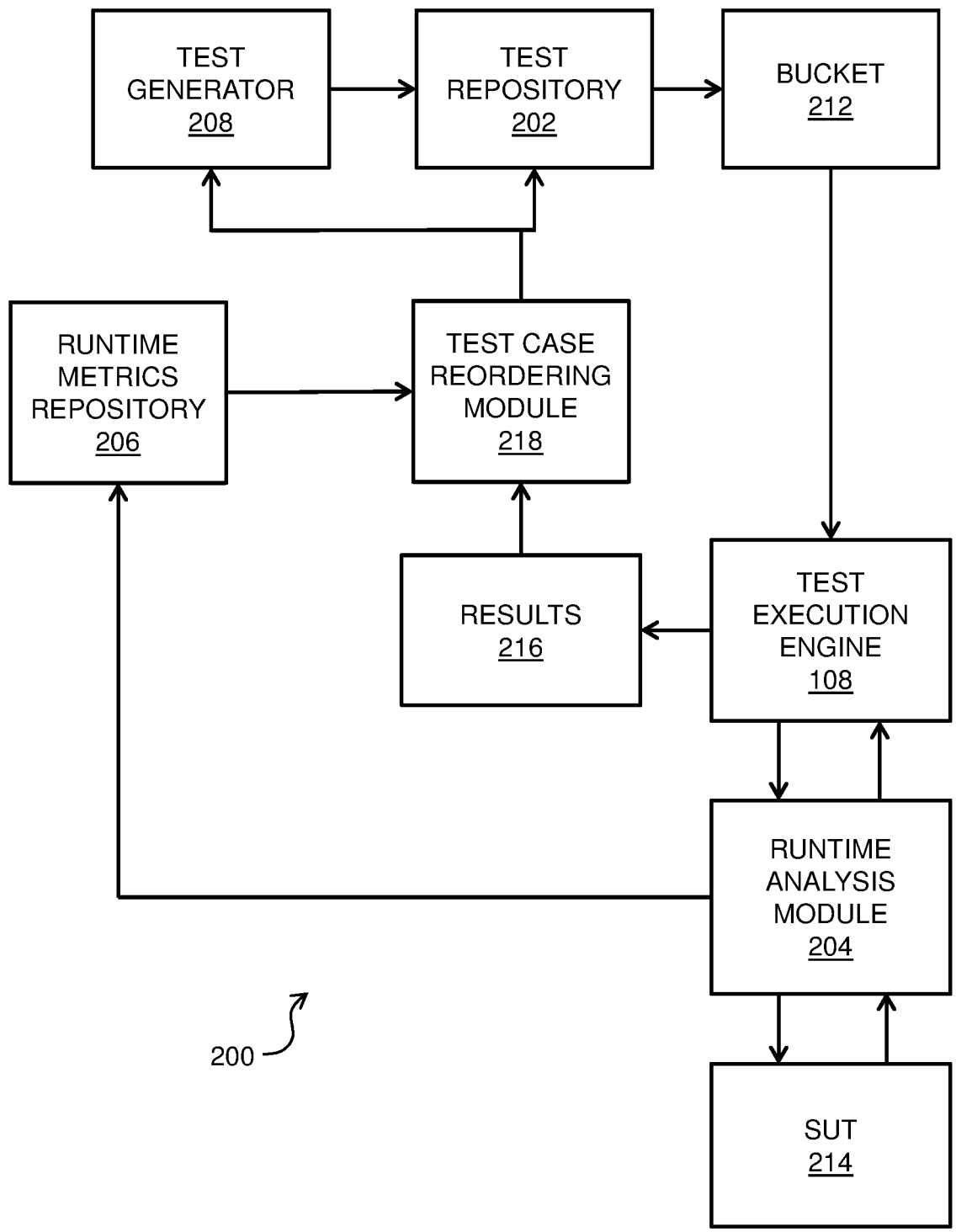
FIG. 2 is a block diagram representing modules providing a testing infrastructure according to an embodiment of the invention.

FIG. 2 is a block diagram representing modules providing a system 200 including a testing infrastructure according to an embodiment of the invention. System 200 may be implemented in conjunction with any appropriate computer system, such as computer system 500 of FIG. 5. System 200 includes a test generator 208. The test generator 208 accesses a test infrastructure, such as a test repository 202, which stores suites of test cases available to verify the correctness of the SUT 214. Each test case specifies an input to be applied to the SUT 214 and the expected response that should be returned in response to this input (to indicate its correct operation). Typically, the test cases are organized into sets (test suites), for example, each test suite may correspond to a different component of the SUT 214.

Inputs to a SUT 214 may be modeled as a collection of attribute value pairs. Any number of attributes may be used to model SUT inputs, and each attribute may take on any number of candidate attribute values. A set of CTD vectors may be generated that provides n-wise coverage of an entire Cartesian product space associated with the collection of attribute-value pairs. In particular, the entire Cartesian product space that contains all possible combinations of the attribute-value pairs is reduced to a smaller set of CTD test vectors that provides complete n-wise coverage of the entire test space. In example embodiments, the complete n-wise coverage provided by the set of CTD vectors may be complete pairwise coverage. For instance, if it is assumed that three attributes are modeled, namely, a "name" attribute, a "color" attribute, and a "shape" attribute, and if it is further assumed that the "name" attribute can take on 4 distinct attributes (Dale, Rachel, Andrew, and Ryan), the "color" attribute can take on 2 distinct attributes (green, blue), and the "shape" attribute can take on 3 distinct attributes (circle, square, triangle), then the total number of possible combinations of attribute-value pairs would be 4*3*2=24. Thus, in this illustrative example, the entire Cartesian product space would include 24 different combinations of attribute-value pairs. In example embodiments, these 24 different combinations of attribute-value pairs are reduced down to a smaller set of combinations that still provides complete n-wise coverage of the Cartesian product space. For instance, if complete pairwise coverage is sought, then the 24 different combinations can be reduced down to 12 distinct combinations that together include every possible pairwise interaction of attribute values.

In some embodiments, a binary decision diagram may be implemented in the test generator 208 to identify a reduced set of CTD vectors that provides complete n-wise coverage based on an initial full set of CTD vectors. While each CTD vector in the set of CTD vectors includes a unique combination of attribute values, the set of CTD vectors itself may not be unique. That is, there may be multiple different sets of CTD vectors, each of which provides complete n-wise coverage. It should be appreciated that while a first set of CTD vectors provides complete pairwise coverage and partial three-wise coverage, a greater number of CTD vectors would be needed to provide complete three-wise coverage. Stated more generally, as n increases, the number of CTD vectors needed to provide complete n-wise coverage increases logarithmically with n. The reduced set of CTD vectors may be used by test generator 208 to generate test cases that are stored in test repository 202.

The test generator 208 creates an execution bucket 212 for each testing run on the SUT 214 based on a subset of test cases from test repository 202. The bucket 212 specifies an order of the subset of test cases from test repository 202 to be executed in a machine-readable language (such as XML-based). Particularly, in the case of a complete test, all the available test cases are executed on each component of the SUT 214; conversely, in the case of a regression test, the execution is limited to a subset of selected test cases. The bucket 212 so obtained can be saved into a file. The bucket 212 may specify an order of the test cases to be executed for a particular iteration of testing of SUT 214.

A test execution engine 108 controls the execution of test cases in the bucket 212 against SUT 214. For each test case of the bucket 212, this involves the application of a corresponding input to the SUT 214. In response thereto, the SUT 214 returns a corresponding output to the test execution engine 108. The test execution engine 108 determines the result of the test case by comparing its output with the corresponding expected response (extracted from the file corresponding to bucket 212, for example). The result of the test case (i.e., positive when the two values match and negative otherwise) is saved into a log. For example, this may be achieved by means of a standard Test Tracking Tool (TTT). The results of the (current) run of the test are available in the log for their analysis.

For a large, complex SUT 214, the test repository 202 can contain a large amount of functionally equivalent test actions/test cases that may have different runtime metrics. In accordance with certain embodiments of the present invention, runtime analysis module 204 may collect runtime data corresponding to execution of test cases from bucket 212 by test execution engine 108, and store the runtime data in runtime metrics repository 206. The runtime metrics repository 206 may store testing information including runtime metrics that correspond to a plurality of modules that are executed during execution of test cases that are stored in the test repository 202. The runtime metrics in runtime metrics repository 206 may include, but are not limited to, elapsed execution time of a module, memory utilization by a module, CPU time of a module, and a number of I/O transactions by a module. In some embodiments, the runtime metrics repository 206 may also include module fingerprints that are determined during execution of test cases from bucket 212 against SUT 214 by test execution engine 108. In some embodiments, the runtime metrics repository 206 can include fingerprints and runtime metrics for most, if not all, of the modules that are exercised by test cases stored in the test repository 202, and a reference to where copies of the test are located throughout the test infrastructure. Each fingerprint may uniquely identify a specific code path covered by the modules of a corresponding test case. In this manner, the system 200 can identify fingerprints (and corresponding modules) that are redundant, and in some cases duplicate. According to embodiments of the present invention, processing of the results 216 of the regression test cases generated by the test generator 208 and executed by the test execution engine 108 may include determination of a code path (e.g., a sequence of modules) traversed during execution of each generated regression test and generation of a fingerprint for each module of an executed regression test based at least in part on the code path. Operation of runtime analysis module 204 is discussed in further detail below with respect to method 300 of FIG. 3.

A test case reordering module 218 analyzes the runtime metrics in runtime metrics repository 206 to determine functionally equivalent test cases, and compares their respective runtime metrics in order to reorder test cases in bucket 212. Test cases of test repository 202 that are determined to have more efficient runtime metrics (e.g., shorter elapsed execution time, lower memory utilization, lower CPU time, and/or fewer I/O transactions) may be selected for execution in bucket 212 before functionally equivalent test cases that have less efficient runtime metrics. Functional equivalence of test cases may be determined in any appropriate manner. For example, in some embodiments, functional equivalence of test cases may be determined based on test case fingerprints that are stored in runtime metrics repository 206; in other embodiments, functional equivalence may be determined manually by a tester. Operation of test case reordering module 218 is discussed in further detail below with respect to method 400 of FIG. 4.

In an example, a first code flow including modules A-B may be determined to be functionally equivalent to a second code flow including modules C-D by test case reordering module 218. The second code flow may also be determined to have more efficient runtime metrics (e.g., a lower elapsed runtime) than the first code flow. The ordering of test cases in bucket 212 may be reweighted such that the first code flow A-B is lower priority, and more C-D tests are included in bucket 212. This would force any test cases that include the A-B code flow to run last, and test cases that do not include the A-B code flow to run first, such that the testing may identify any errors in the SUT 214 more quickly. Table 1 illustrates an example initial order of test programs in a bucket 212:

TABLE 1

Initial order of test cases in execution bucket

Test 1: ABCD
Test 2: ACBD
Test 3: BCDA
Test 4: ABDC
Test 5: ADE
Test 6: CBD
Test 7: BCD
Test 8: BDAC
Test 9: ACDB
Test 10: CDE After Test 4 completes in Table 1, test case reordering module 218 may determine that A-B is functionally equivalent to C-D, and C-D has more efficient runtime metrics than A-B (e.g., a lower elapsed runtime). Based on the analysis, test case reordering module 218 may re-order test cases in the bucket 212 such that tests with A-B or A-x-B are put at the end of, or omitted from, the execution run, as illustrated in Table 2, or re-weight the ordering of A-B or A-x-B and regenerate new test cases such that the C-D ordering is favored over the A-B ordering, as illustrated in Table 3.

TABLE 2

Reordered test cases in execution bucket

Test 3: BCDA
Test 10: CDE
Test 7: BCD
Test 6: CBD
Test 5: ADE
Test 8: BDAC
**Tests 9, 1, 2, 4 may be either executed or
omitted in various embodiments**
Test 9: ACDB
Test 1: ABED
Test 2: ACBD
Test 4: ABDC

TABLE 3

Regenerated test cases in execution bucket

Test 1: CDBE
Test 2: ACD
Test 3: BCDA
Test 10: CDE
Test 7: BCD
Test 6: CBD
Test 4: CBA
Test 5: ADE
Test 8: BDAC
Test 9: ADC It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., additional memory components, embedded controllers, functional blocks, connections between functional blocks, modules, inputs, outputs, etc.).

Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
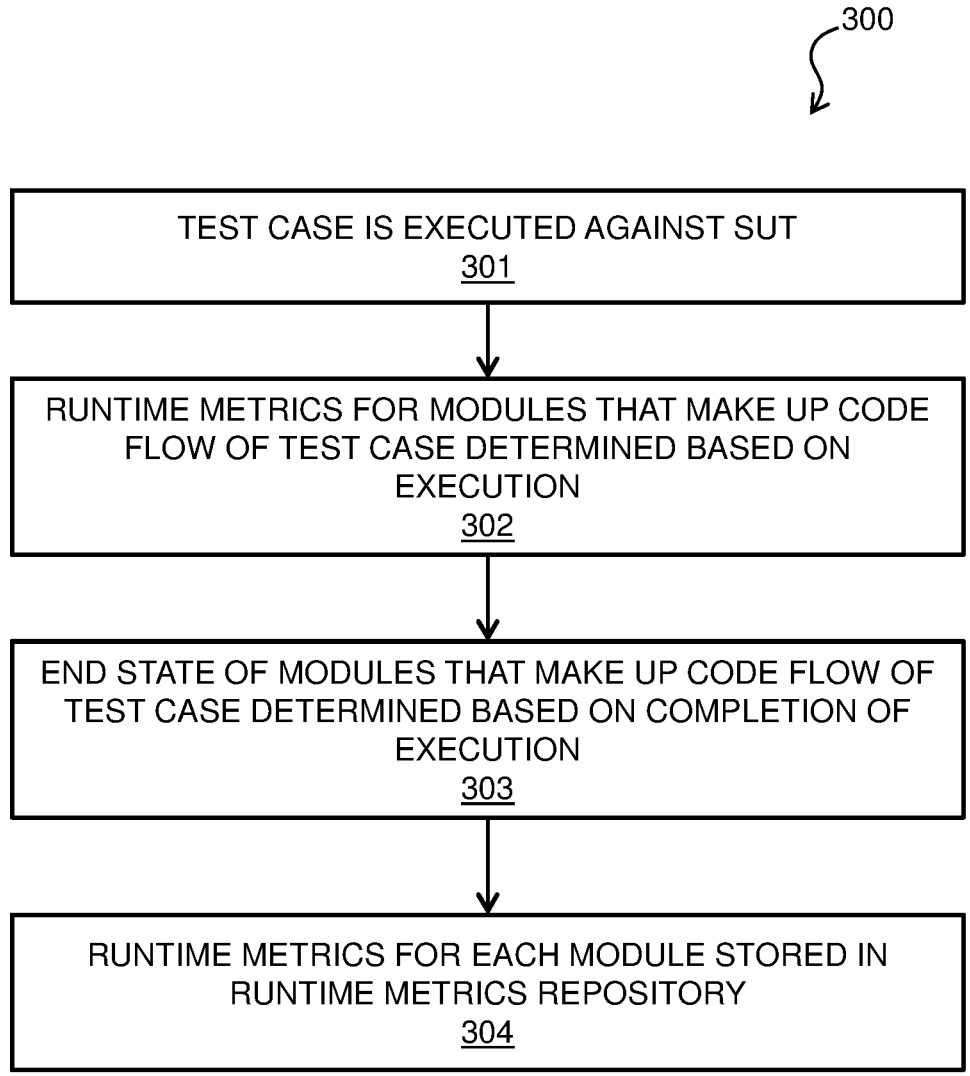
FIG. 3 is a flow diagram of a process for runtime metrics accumulation for runtime metrics based test ordering in accordance with one or more embodiments of the present invention.

FIG. 3 shows a process flow diagram of a method 300 for runtime metrics accumulation for runtime metrics based test ordering in accordance with one or more embodiments of the present invention. Embodiments of method 300 may be implemented in runtime analysis module 204 of system 200 of FIG. 2. In block 301 of method 300 of FIG. 3, a test case corresponding to a code flow comprising a plurality of modules (e.g., functions) is executed against SUT 214 by test execution engine 108. For example, a code flow of a first test case that may be executed in block 301 of method 300 may exercise modules A-B-C of SUT 214. In block 302, for each module in the test case, one or more runtime metrics are determined by runtime analysis module 204. The runtime metrics that are gathered in block 302 may include, but are not limited to, elapsed execution time of a module, memory utilization by a module, CPU time of a module, and a number of I/O transactions by a module. For example, for the first test case, runtime analysis module 204 may determine that module A may run in 5 units of time, module B may run in 2 units of time, and module C may run in 2 units of time. In block 303, for each module of the code flow of the test case, an end state is determined. The end state may be determined based on a fingerprint of the module in some embodiments. In block 304, the runtime metrics and end states that were determined by runtime analysis module 204 for the modules of the test case in blocks 302 and 303 are provided for storage in runtime metrics repository 206.

Method 300 of FIG. 3 may be repeated for each test case of bucket 212 that is executed by test execution engine 108 during testing of SUT 214. The runtime metrics and end state data that is determined by method 300 of FIG. 3 may be used by test case reordering module 218 to reorder waiting test cases in bucket 212 in some embodiments, or may be used to generate a next iteration of bucket 212 by test generator 208 in some embodiments. Test cases from a reordered bucket 212 may then be executed by test execution engine 108, and runtime metrics and end state data according to method 300 of FIG. 3 may continue to be determined for the modules that make up the code flows of the reordered test cases by runtime analysis module 204.

For example, in a subsequent iteration of method 300 of FIG. 3, a second test case may include a code flow including modules D-B-C, in which module D may run in 3 units of time, module B may run in 2 units of time, and module C may run in 2 units of time, as determined in block 302 of method 300. If module A and module D are determined to be functionally equivalent based on their respective end states that were determined in block 303, then the second test case including modules D-B-C may run in less time than the first test case including modules A-B-C. To save time in the execution of the testing, a binary decision diagram may be recalculated during testing to run second test case including the D-B-C code flow before the first test case including the A-B-C code flow. The recalculated binary decision diagram may maintain 100% n-wise coverage for the testing, due to the functional equivalence of module A and module D. Testing may be dynamically adjusted based on the runtime metrics and end state data that is stored in runtime metrics repository 206. The binary decision diagram output may be recalculated as time progresses during the testing by test case reordering module 218. Recalculating the binary decision diagram may include reweighting the priorities of any remaining legs of the binary decision diagram. A next iteration of test entities may be selected by test generator 208 based on the newly weighted binary decision diagram. Adjustment of the testing based on the runtime metrics and end states determined according to method 300 is discussed in further detail with respect to method 400 of FIG. 4.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
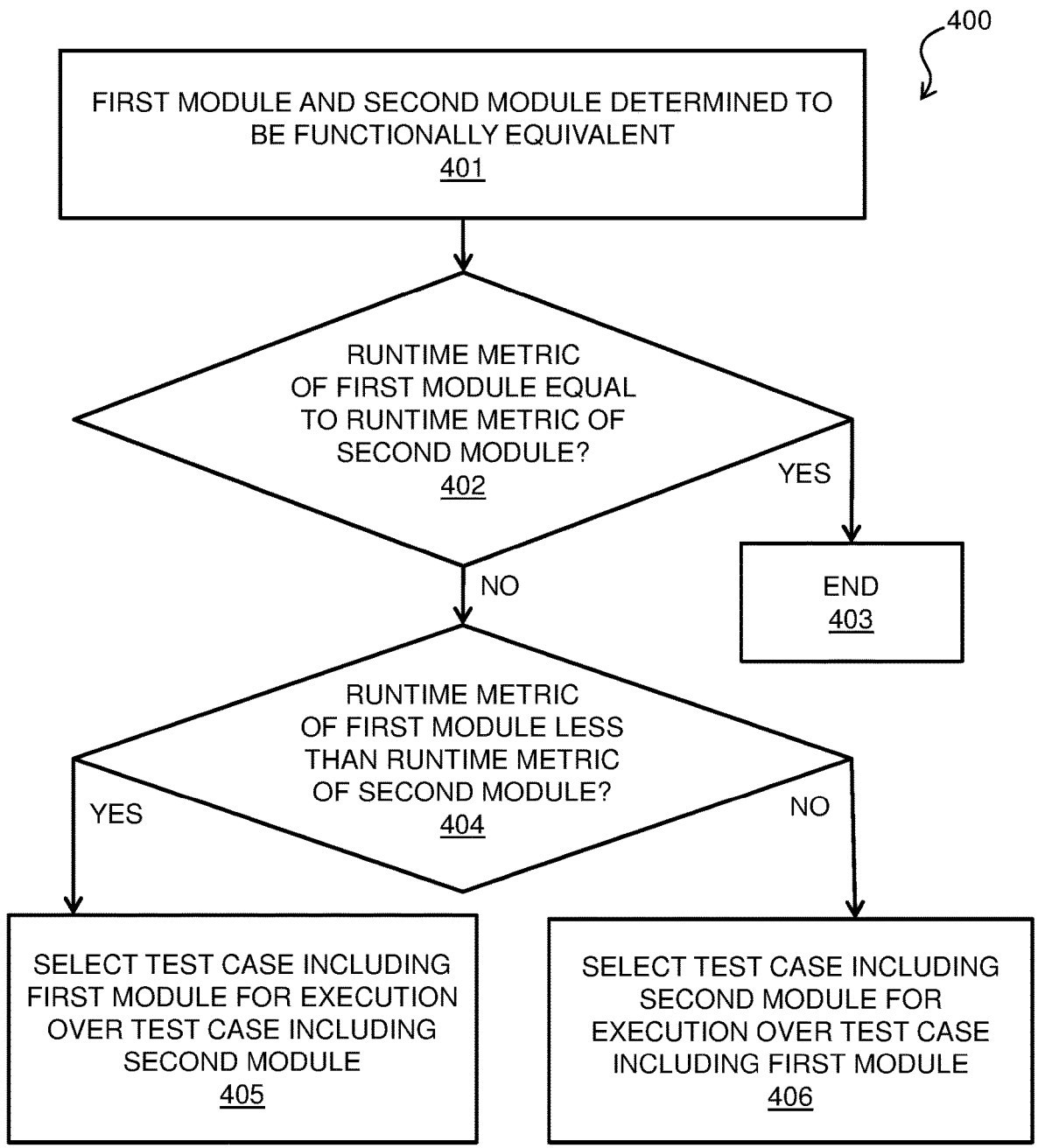
FIG. 4 is a flow diagram of a process for runtime metrics based test ordering in accordance with one or more embodiments of the present invention.

FIG. 4 shows a process flow diagram of a method 400 for runtime metrics based test ordering in accordance with one or more embodiments of the present invention. Embodiments of method 400 may be implemented in test case reordering module 218 in system 200 of FIG. 2, and may operate using runtime metrics and end state data from runtime metrics repository 206 that was determined according to method 300 of FIG. 3 by runtime analysis module 204. In block 401, it is determined whether a first module and a second module are functionally equivalent. The first module and the second module may have each been previously executed by test execution engine 108 as part of respective test cases of bucket 212, and end state data may have been determined for each of the first module and the second module according to block 303 of method 300 of FIG. 3. In some embodiments, block 401 of method 400 of FIG. 4 may be triggered based on detecting any two modules having a same end state during testing in a test system such as system 200 of FIG. 2, such that the two modules are determined to be functionally equivalent in block 401. In some embodiments, the first module and second module may be determined to be functionally equivalent in block 401 based on fingerprint data. Flow proceeds from block 401 to block 402. In block 402, it is determined whether a runtime metric of the first module is equal to runtime metric of the second module. If it is determined in block 402 that the runtime metric of the first module is equal to the runtime metric of the second module, flow proceeds from block 402 to block 403, and method 400 ends. The runtime metrics that are compared in block 402 of method 400 may include, but are not limited to, elapsed execution time of a module, memory utilization by a module, CPU time of a module, and a number of I/O transactions by a module.

If it is determined in block 402 that the runtime metric of the first module is not equal to the runtime metric of the second module, flow proceeds from block 402 to block 404. In block 404, it is determined whether the runtime metric of the first module is less than the runtime metric of the second module. If it is determined in block 404 that the runtime metric of the first module is less than the runtime metric of the second module, flow proceeds from block 404 to block 405. In block 405, a test case including the first module is selected for execution over a test case including the second module. For example, the test case including the first module may be selected for execution before or instead of the test case including the second module in bucket 212 in some embodiments of block 405. A binary decision diagram may be recalculated in block 405 to run the first module before the second module. The recalculated binary decision diagram may maintain 100% n-wise coverage for the testing, due to the functional equivalency the first module and second module. The binary decision diagram output may be recalculated as time progresses during the testing. Recalculating the binary decision diagram may include reweighting the priorities of any remaining legs of the binary decision diagram. A next iteration of test entities may be selected from test repository 202 for inclusion in bucket 212 based on the reweighted binary decision diagram.

If it is determined in block 404 that the runtime metric of the first module is not less than the runtime metric of the second module, flow proceeds from block 404 to block 406. In block 406, a test case including the second module is selected for execution over a test case including the first module. For example, the test case including the second module may be selected for execution before or instead of the test case including the first module in bucket 212 in some embodiments of block 406. A binary decision diagram may be recalculated in block 406 to run the second module before the first module. The recalculated binary decision diagram may maintain 100% n-wise coverage for the testing, due to the functional equivalency the first module and second module. The binary decision diagram output may be recalculated as time progresses during the testing. Recalculating the binary decision diagram may include reweighting the priorities of any remaining legs of the binary decision diagram. A next iteration of test entities may be selected from test repository 202 for inclusion in bucket 212 based on the reweighted binary decision diagram.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
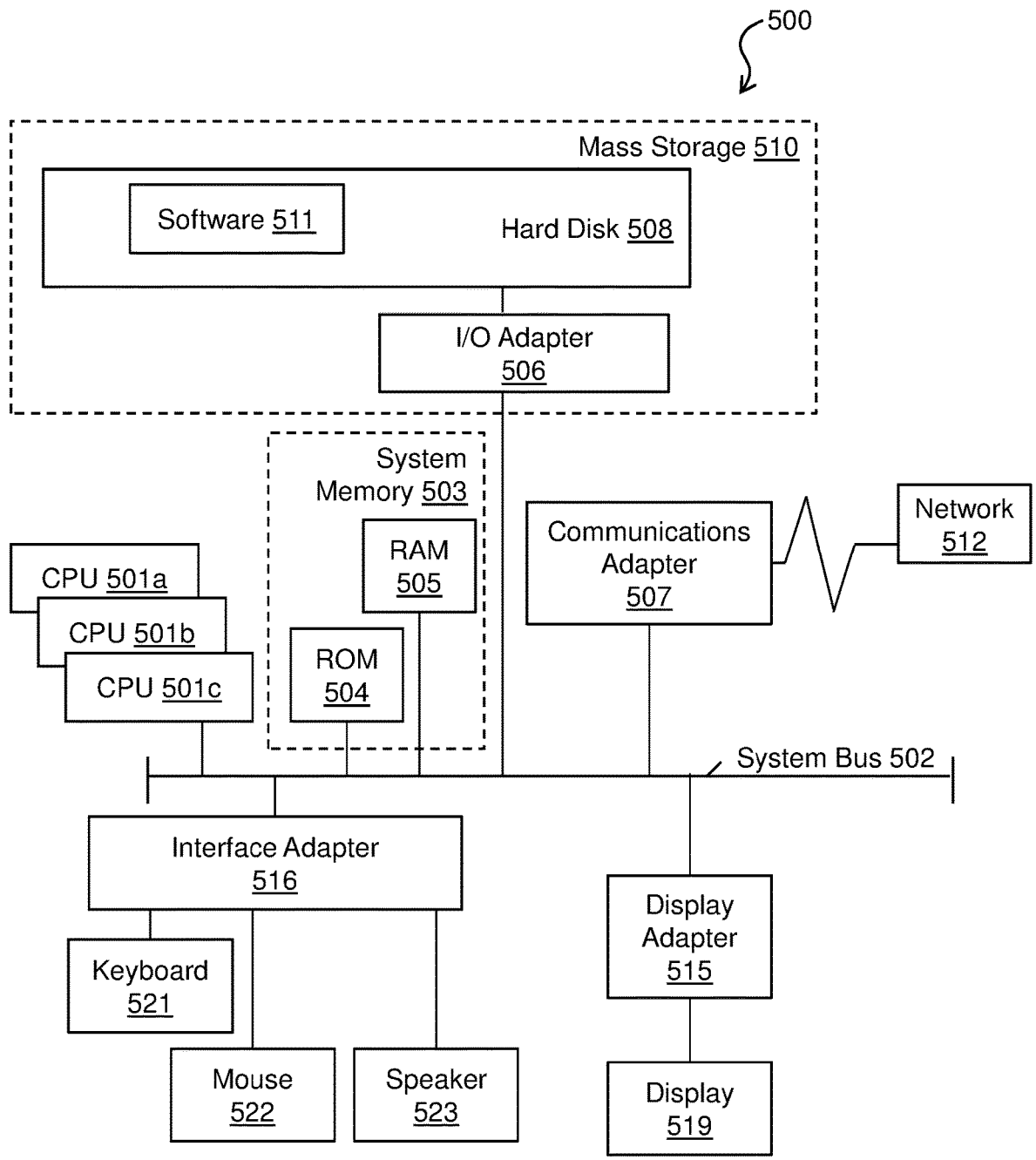
FIG. 5 is a block diagram of an example computer system for use in conjunction with one or more embodiments of runtime metrics based test ordering.

Turning now to FIG. 5, a computer system 500 is generally shown in accordance with an embodiment. The computer system 500 can be an electronic, computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 may be, for example, a server, desktop computer, laptop computer, tablet computer, or smartphone. In some examples, computer system 500 may be a cloud computing node. Computer system 500 may be described in the general context of computer system executable instructions, such as program modules, being executed by a computer system. Generally, program modules may include routines, programs, objects, components, logic, data structures, and so on that perform particular tasks or implement particular abstract data types. Computer system 500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system 500 has one or more central processing units (CPU(s)) 501a, 501b, 501c, etc. (collectively or generically referred to as processor(s) 501). The processors 501 can be a single-core processor, multi-core processor, computing cluster, or any number of other configurations. The processors 501, also referred to as processing circuits, are coupled via a system bus 502 to a system memory 503 and various other components. The system memory 503 can include a read only memory (ROM) 504 and a random access memory (RAM) 505. The ROM 504 is coupled to the system bus 502 and may include a basic input/output system (BIOS), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read only memory, flash memory, or any other suitable memory systems.

The computer system 500 comprises an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 may be stored in the mass storage 510. The mass storage 510 is an example of a tangible storage medium readable by the processors 501, where the software 511 is stored as instructions for execution by the processors 501 to cause the computer system 500 to operate, such as is described herein below with respect to the various Figures. Examples of computer program product and the execution of such instruction is discussed herein in more detail. The communications adapter 507 interconnects the system bus 502 with a network 512, which may be an outside network, enabling the computer system 500 to communicate with other such systems. In one embodiment, a portion of the system memory 503 and the mass storage 510 collectively store an operating system, which may be any appropriate operating system, such as the z/OS or AIX operating systems from International Business Machines Corporation, to coordinate the functions of the various components shown in FIG. 5.

Additional input/output devices are shown as connected to the system bus 502 via a display adapter 515 and an interface adapter 516 and. In one embodiment, the adapters 506, 507, 515, and 516 may be connected to one or more I/O buses that are connected to the system bus 502 via an intermediate bus bridge (not shown). A display 519 (e.g., a screen or a display monitor) is connected to the system bus 502 by a display adapter 515, which may include a graphics controller to improve the performance of graphics intensive applications and a video controller. A keyboard 521, a mouse 522, a speaker 523, etc. can be interconnected to the system bus 502 via the interface adapter 516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 500 includes processing capability in the form of the processors 501, and, storage capability including the system memory 503 and the mass storage 510, input means such as the keyboard 521 and the mouse 522, and output capability including the speaker 523 and the display 519.

In some embodiments, the communications adapter 507 can transmit data using any suitable interface or protocol, such as the internet small computer system interface, among others. The network 512 may be a cellular network, a radio network, a wide area network (WAN), a local area network (LAN), or the Internet, among others. An external computing device may connect to the computer system 500 through the network 512. In some examples, an external computing device may be an external webserver or a cloud computing node.

It is to be understood that the block diagram of FIG. 5 is not intended to indicate that the computer system 500 is to include all of the components shown in FIG. 5. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:
1. A computer-implemented method comprising:
  determining, by a processor, a bucket comprising an ordered plurality of test cases corresponding to a testing run of a system under test (SUT), the ordered plurality of test cases comprising a first test case and a second test case; and starting the testing run, wherein starting the testing run comprises:
  executing, by the processor, the first test case against the SUT, wherein executing the first test case comprises executing a first module;
  determining a first end state and a first runtime metric associated with the first module based on the execution of the first test case;
  executing the second test case against the SUT, wherein executing the second test case comprises executing a second module;
  determining a second end state and a second runtime metric associated with the second module based on the execution of the second test case;
  determining that the first end state and the second end state are the same, the first end state including a first fingerprint that identifies a first code path covered by the first test case, and the second end state including a second fingerprint that identifies a second code path covered by the second test case; and
  based on determining that the first end state and the second end state are the same:
    comparing the first runtime metric comprising a first memory utilization and the second runtime metric comprising a second memory utilization to determine that the first memory utilization is less than the second memory utilization;
    reordering the plurality of test cases in the bucket based on the comparison of the first runtime metric having the first memory utilization and the second runtime metric having the second memory utilization;
    continuing the testing run based on the reordered plurality of test cases in the bucket;
    during a subsequent iteration, comparing the first runtime metric comprising a first I/O transactions and the second runtime metric comprising a second I/O transactions to determine that the first I/O transactions are less than the second I/O transactions; and
    selecting the first test case for execution before the second test case based at least in part on the first I/O transactions being less than the second I/O transactions.

2. The method of claim 1, further comprising storing the first runtime metric, the second runtime metric, the first end state, and the second end state in a runtime data repository.

3. The method of claim 1, wherein reordering the plurality of test cases in the bucket further comprises reordering the plurality of test cases to prioritize the first module over the second module.

4. The method of claim 1, wherein the first and second runtime metrics comprise one of elapsed execution time, memory utilization, central processing unit (CPU) time, and a number of Input/Output (I/O) transactions.

5. The method of claim 1, wherein the plurality of cases comprises a third test case that includes the second module, and further comprising not executing the third test case of the plurality of test cases during the testing run corresponding to the bucket based on the comparison of the first runtime metric and the second runtime metric.

6. The method of claim 1, further comprising storing the first runtime metric, the first fingerprint, and a reference to where a copy of the first test case is located, the storing in a runtime data repository.

7. The method of claim 1, wherein the reordering comprises recalculating a binary decision diagram corresponding to the testing run.

8. A system comprising:
  a memory having computer readable instructions; and
  one or more processors for executing the computer readable instructions, the computer readable instructions controlling the one or more processors to perform operations comprising:
    determining a bucket comprising an ordered plurality of test cases corresponding to a testing run of a system under test (SUT), the ordered plurality of test cases comprising a first test case and a second test case; and
    starting the testing run, wherein starting the testing run comprises:
      executing, by the processor, the first test case against the SUT, wherein executing the first test case comprises executing a first module;
      determining a first end state and a first runtime metric associated with the first module based on the execution of the first test case;
      executing the second test case against the SUT, wherein executing the second test case comprises executing a second module;
      determining a second end state and a second runtime metric associated with the second module based on the execution of the second test case;
      determining that the first end state and the second end state are the same; and
      based on determining that the first end state and the second end state are the same:
      comparing the first runtime metric comprising a first memory utilization and the second runtime metric comprising a second memory utilization to determine that the first test case is more efficient than the second test case based at least in part on the first memory utilization being less than the second memory utilization;
      modifying the plurality of test cases in the bucket based on the comparison of the first runtime metric having the first memory utilization and the second runtime metric having the second memory utilization, the modifying comprising recalculating a binary decision diagram corresponding to the testing run;
    continuing the testing run based on the reordered plurality of test cases in the bucket;
      during a subsequent iteration, comparing the first runtime metric comprising a first I/O transactions and the second runtime metric comprising a second I/O transactions to determine that the first I/O transactions are less than the second I/O transactions; and
      selecting the first test case for execution before the second test case based at least in part on the first I/O transactions being less than the second I/O transactions.

9. The system of claim 8, further comprising storing the first runtime metric, the second runtime metric, the first end state, and the second end state in a runtime data repository.

10. The system of claim 8, wherein modifying the plurality of test cases in the bucket further comprises reordering the plurality of test cases to prioritize the first module over the second module.

11. The system of claim 8, wherein the first and second runtime metrics comprise one of elapsed execution time, memory utilization, central processing unit (CPU) time, and a number of Input/Output (I/O) transactions.

12. The system of claim 8, wherein the plurality of cases comprises a third test case that includes the second module, and further comprising not executing the third test case of the plurality of test cases during the testing run corresponding to the bucket based on the comparison of the first runtime metric and the second runtime metric.

13. A computer program product comprising a computer readable storage medium having program instructions embodied therewith, the program instructions executable by one or more processors to cause the one or more processors to perform operations comprising:
   determining a bucket comprising an ordered plurality of test cases corresponding to a testing run of a system under test (SUT), the ordered plurality of test cases comprising a first test case and a second test case; and
   starting the testing run, wherein starting the testing run comprises:
      executing, by the processor, the first test case against the SUT, wherein executing the first test case comprises executing a first module;
      determining a first end state and a first runtime metric associated with the first module based on the execution of the first test case;
      executing the second test case against the SUT, wherein executing the second test case comprises executing a second module;
      determining a second end state and a second runtime metric associated with the second module based on the execution of the second test case;
      determining that the first end state and the second end state are the same, the first end state including a first fingerprint that identifies a first code path covered by the first test case, and the second end state including a second fingerprint that identifies a second code path covered by the second test case; and
      based on determining that the first end state and the second end state are the same:
         comparing the first runtime metric comprising a first memory utilization and the second runtime metric comprising a second memory utilization to determine that the first memory utilization is less than the second memory utilization;
         reordering the plurality of test cases in the bucket based on the comparison of the first runtime metric having the first memory utilization and the second runtime metric having the second memory utilization, the reordering comprising recalculating a binary decision diagram corresponding to the testing run;
         continuing the testing run based on the reordered plurality of test cases in the bucket;
         during a subsequent iteration, comparing the first runtime metric comprising a first I/O transactions and the second runtime metric comprising a second I/O transactions to determine that the first I/O transactions are less than the second I/O transactions; and
         selecting the first test case for execution before the second test case based at least in part on the first I/O transactions being less than the second I/O transactions.

14. The computer program product of claim 13, further comprising storing the first runtime metric, the second runtime metric, the first end state, and the second end state in a runtime data repository.

15. The computer program product of claim 13, wherein reordering the plurality of test cases in the bucket further comprises reordering the plurality of test cases to prioritize the first module over the second module.

16. The computer program product of claim 13, wherein the first and second runtime metrics comprise one of elapsed execution time, memory utilization, central processing unit (CPU) time, and a number of Input/Output (I/O) transactions.

* * * * *